United States Patent [19]

Sato et al.

[11] Patent Number: 4,812,749
[45] Date of Patent: Mar. 14, 1989

[54] BIMETALLIC INDICATOR

[75] Inventors: Yoshitake Sato; Toshio Ohike; Youji Nakazaki, all of Shizuoka, Japan

[73] Assignee: Yazaki Corporation, Japan

[21] Appl. No.: 82,583

[22] Filed: Aug. 7, 1987

[30] Foreign Application Priority Data

Aug. 8, 1986 [JP] Japan .................... 61-121035[U]

[51] Int. Cl.$^4$ .......................... G01R 5/22; G01R 5/26
[52] U.S. Cl. .................... 324/106; 324/131;
324/132; 74/435; 235/144 ME
[58] Field of Search .......... 324/106, 131, 132;
374/200, 206, 207, 195; 74/98, 435; 235/1 C,
144 M, 144 E

[56] References Cited

U.S. PATENT DOCUMENTS

| | | | |
|---|---|---|---|
| 2,881,630 | 4/1959 | Opocensky | 74/435 |
| 3,327,209 | 6/1967 | Baker | 324/106 |
| 3,354,814 | 11/1967 | Friedman | 74/435 |
| 3,631,341 | 12/1971 | Kazuno | 324/106 |
| 3,722,458 | 3/1973 | Chiang | 324/106 |
| 3,918,313 | 11/1975 | Montagnino | 74/435 |
| 3,924,468 | 12/1975 | Persson | 374/195 |

FOREIGN PATENT DOCUMENTS

| | | | |
|---|---|---|---|
| 1147062 | 4/1963 | Fed. Rep. of Germany | 235/144 ME |
| 2049494 | 12/1971 | Fed. Rep. of Germany | 374/205 |
| 0137485 | 10/1981 | Japan | 235/144 ME |
| 0115326 | 8/1984 | Japan | . |

Primary Examiner—Reinhard J. Eisenzopf
Assistant Examiner—W. Burns
Attorney, Agent, or Firm—Wigman & Cohen

[57] ABSTRACT

A bimetallic indicator includes a bimetal being deformed by heat generated by an electric current supplied to a heat coil wound around the bimetal, a pointer moved in relation to the deformation of the bimetal and indicating a measured value in accordance with an amount of electric current supplied to the heating coil, and a driving gear, which is rotated by the deformation of said bimetal. The driving gear includes two first pitch portions each having a plurality of teeth with a regular pitch and a second pitch portion provided between the first pitch portions and having a pitch smaller than that of the first pitch portion. A driven gear to which the pointer is mounted is engaged with the driving gear and rotated together with the pointer by the rotation of the driving gear. The rotation of the driving gear is transmitted to the driven gear only when the first pitch portion of the driving gear is in engagement with the driven gear. When the driven gear is in engagement with the second pitch portion of the driving gear, the driven gear is not rotated, so that the pointer is directed to a point in a zone which indicates that the measured object is in a normal condition.

10 Claims, 8 Drawing Sheets

BIMETALLIC INDICATOR

BACKGROUND OF THE INVENTION

1. Field of the Invention

This invention generally relates to a bimetallic indicator, in particular to a bimetallic indicator for use in a heat gauge indicating a temperature of an engine cooling water of an automobile or a pressure gauge indicating a pressure of a pressurized air supplied to a turbo engine, and so forth.

2. Description of the Prior Art

A conventional bimetallic indicator of this type is for example illustrated in FIG. 1. In the drawing, the indicator is a heat gauge used in an automobile, which comprises a thermistor sensor 1 in which resistance value is varied in accordance with temperature change in a cooling water of an automobile engine or the like and a bimetal 3 on which a heating coil 2 is wound. In proportion to change of the resistance value in the thermistor sensor 1, electric current corresponding to the change is supplied to the heating coil 2, thereby the bimetal 3 being heated and then deformed. A movable pin 3a mounted to the bimetal 3 is slidably inserted into a slit 5a formed on an end portion of a pointer 5 which is rotationally supported by a pointer axis 4. Accordingly, when an amount of electrical current in proportion to the temperature change of the cooling water is supplied to the heating coil 2, the heating coil 2 is heated and the bimetal 3 is deformed by the heat. As a result, the movable pin 3a is moved by the deformation of the bimetal 3 and then the pointer 5 is also rotated with respect to the pointer axis 4 in accordance with the movement of the movable pin 3a, thereby the temperature of the cooling water being indicated on scales of a scale plate 6 by the pointer 5.

In the type of the indicator, however, generally, there are dispersions in indication of the indicator and resistance value of the thermistor sensor, as well as there may be a difference in a temperature of a cooling water according to the type of an engine of an automobile. Due to these factors, when the indicator is equipped in an automobile, large dispersion in indication of the indicator is apt to be caused.

In this case, for example, if such a dispersion is caused in a high temperature range over the actual temperature which is in a normal condition of the cooling water of the engine, the driver may be anxious about a possibility of over-heat. On the other hand, in a case where such a dispersion is caused in a low temperature range under the actual temperature, the driver may be anxious about that something is wrong with the automobile due to the temperature of the cooling water being not rose.

In view of the foregoing disadvantages of the conventional indicator, the improved indicator as shown in FIG. 2 was proposed, which is described in the Publication of the Japanese Utility Model Application No. 59-115326. In the improved indicator, a movable plate 7 with a pointer 5 is fixed to the pointer axis 4. The movable plate 7 has a meander guide slit 7a. In the middle portion of the guide slit 7a, there is provided a pointer non-moved portion 7'. Said portion 7' is formed along the line that the movable pin 3a attached to the bimetal (not shown) is moved when a temperature of the cooling water is in a normal condition. As a result, in a case where the movable pin 3a displaces in the portion 7' the pointer 5 is not moved. Therefore, even if the dispersion of the indication is caused when the temperature is in the normal condition, the pointer keeps on indicating a fixed value in an indicating zone indicating that the temperature resides in the normal condition, thereby it can be prevented that the driver becomes anxious about due to reading the uncorrect indication of the pointer caused by the dispersion.

In the improved bimetallic indicator, however, there is the other disadvantage that an angle which the pointer 5 can be moved on a scale becomes small. This is because the movable plate 7 and the pointer 5 that cooperates with the movable plate 7 are being stopped during the guide pin 3a runs within the portion 7', in which the movable plate 7 and the pointer 5 can not be moved in spite of the deformation of the bimetal 3. In addition, there is further disadvantage that swinging of the pointer due to external force such as vibration during the movable pin 3a is positioned in the portion 7a' is apt to be caused. This is because a clearance between the movable pin 3a and slit 7a' is large in the rotational direction of the pointer 5, so that the pointer 5 is liable to be affected by the external force.

SUMMARY OF THE INVENTION

In view of the foregoing disadvantages in the conventional indicators, this invention has been made. Accordingly, an object of the present invention is to provide a novel and improved bimetallic indicator which can prevent a dispersion of indication of a pointer from causing in a zone which indicates that a measuring object of the indicator is in a normal condition and can obtain a sufficient indication angle of the pointer.

Another object of the present invention is to provide a bimetallic indicator which can prevent a swinging of the pointer caused by the external force during the pointer is indicating the zone which indicates the normal condition.

Further object of the present invention is to provide a bimetallic indicator which can increase accuracy of indication.

In order to achieve the main object, the bimetallic indicator according to the present invention comprises a bimetal being deformed by a heat generated by an electric current supplied to a heat coil wound around the bimetal, a pointer moved in relation to the deformation of the bimetal and indicating a measured value in accordance with an amount of electric current supplied to the heating coil, a driving gear rotated by the deformation of said bimetal, and said driving gear including two first pitch portions each having a plurality of teeth with a regular pitch and a second pitch portion provided between the first pitch portions and having a pitch larger than that of the first pitch portion, and a driven gear to which said pointer is mounted, and said driven gear being engaged with said driving gear and rotated together with the pointer by the rotation of the driving gear, wherein the rotation of the driving gear is transmitted to the driven gear only when the first pitch portion of the driving gear is engagement with the driven gear.

According to the bimetallic indicator having the above structures, it can be possible to obtain the following results. Specifically, the first and second pitch portions are formed on the driving gear, and the driven gear can not be driven during the driven gear is engagement with the second pitch portion. Then, the pointer indicates a zone indicating a normal condition of a measuring object of the indicator. Therefore it is possible that the pointer keeps on indicating at a fixed point in the zone indicating the normal condition during the engagement of the driven gear and the second pitch portion of the driving gear. Thereby, it is possible to prevent an occurrence of a dispersion of indication when the measuring object is in the normal condition.

Further, since the bimetallic indicator of this invention is constructed such that the deformation of the bimetal is transmitted to the driving gear to rotate it, and the rotation of the driving gear is transmitted to the driven gear to move the pointer. Accordingly, by selecting the gear ratio between the driving and driven gears and changing a connecting point between the bimetal and driving gear, it is easy to obtain an enlarged indication angle of the pointer in comparison with the deformation ratio of the bimetal.

These and other objects and advantages of the present invention, as well as the data is of illustrative embodiments, will be more fully understood from the following description and drawings, in which:

DETAILED DESCRIPTION OF THE PREFERRED EMBODIMENTS:

Referring now to the accompanying drawings, the preferred embodiments of the present invention will be described.

Figure 1:
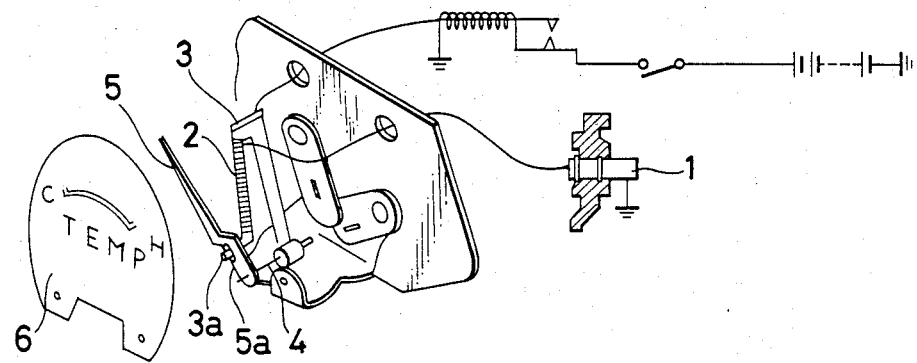
FIG. 1 is a perspective view of a prior art indicator.
Figure 2:
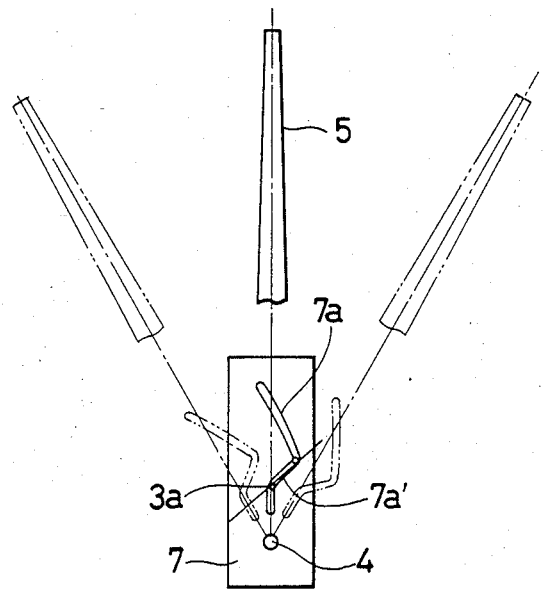
FIG. 2 is a plan view of the other prior art indicator.
Figure 3:
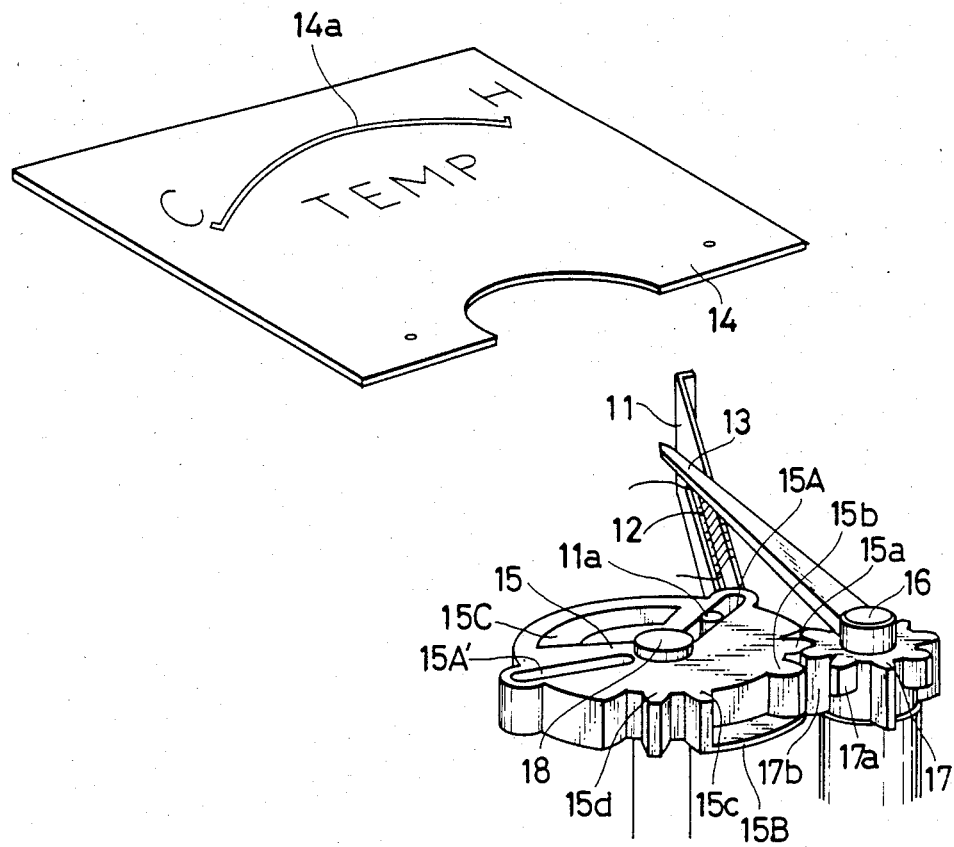
FIG. 3 is a perspective view of a bimetallic indicator of the first embodiment of the present invention.
Figure 4:
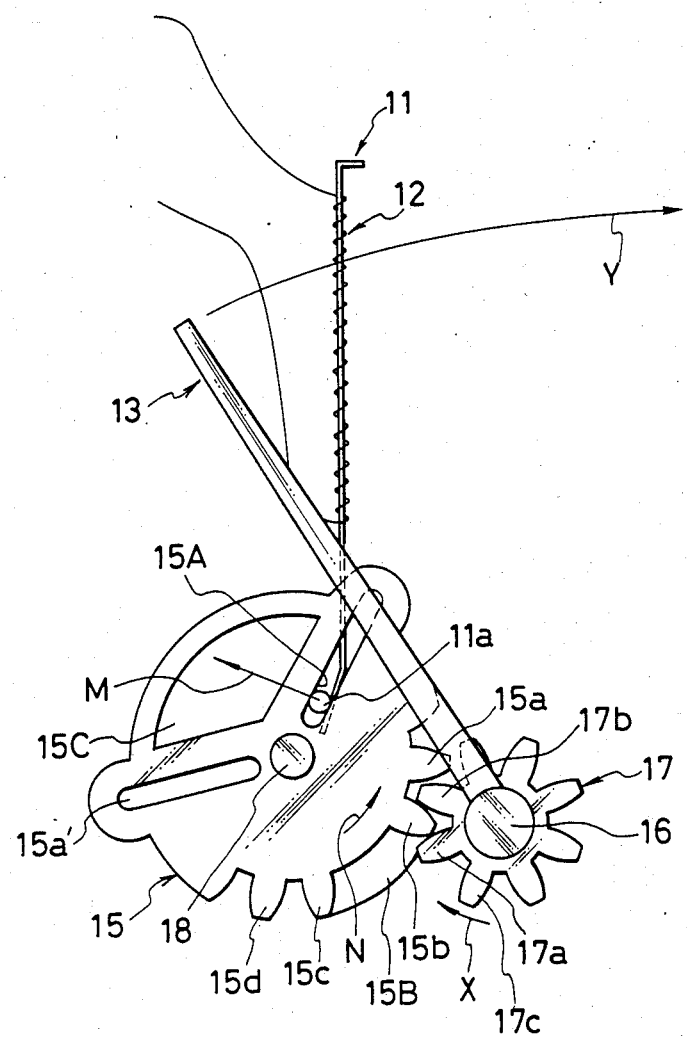
FIG. 4 is a plan view of the indicator of the embodiment.

FIGS. 3 and 4 illustrate the first embodiment of a bimetallic indicator of the present invention. Said bimetallic indicator is constituted as a heat gauge which comprises a bimetal 11 on which a heating coil 12 is wound. Said heating coil 12 is heated by electric current supplied thereto in accordance with temperature change of the cooling water. Said bimetal 11 is deformed by the heat generated in the heating coil 12. Said bimetallic indicator further comprises a driving gear 15 rotated by the deformation of the bimetal 11, a driven gear 17 engaged with said driving gear 15 and driven by the driving gear 15 rotationally, a pointer 13 mounted to the driven gear 17 being rotated in accordance with the rotation of the driven gear 17 and a scale plate 14 having an arched window 14a through which the rotational movement of the pointer 13 can be observed. As a result, the temperature of the cooling water can be indicated by the position of the pointer 13 with respect to the arched window 14a.

Said bimetal 11 is supported at one end fixedly, so that the other end can be deformably displaced. At the other end of the bimetal 11, there is provided a movable pin 11a by spot welding. Said movable pin 11a is slidably inserted into an oblong aperture 15A formed in the driving gear 15 in the radial direction. Said driving gear 15 can be rotated with respect to the axis 18. In this case, it is preferable that the inserting position of the movable pin 11a to the oblong aperture 15A is in proximity to the rotational axis 18 to obtain large angle of rotation of the driving gear 15.

Said driving gear 15 is rotated toward the arrow N in FIG. 4, when the bimetal 11 is deformed toward the arrow M in FIG. 4 and pushes the inner wall of the oblong aperture 15A.

Teeth of the driving gear 15 are provided only in a part of the circumference thereof. The driving gear 15 can be rotated by the deformation of the bimetal 11 within an angle corresponding to the part. The teeth of the driving gear 15 are in engagement with teeth of the driven gear 17 to which the pointer 13 is mounted. The driven gear 17 can be rotated with respect to the axis 16. Accordingly, when the driving gear 15 is rotated in the direction of the arrow N, then the driven gear 17 is rotated toward the opposite direction which is indicated by the arrow X, so that the pointer 13 is rotated toward the arrow Y.

Said driving gear 15 includes in the embodiment shown in FIG. 4, two first pitch portions which comprise teeth 15a and 15b or 15c and 15d, respectively. The pitch between the teeth 15a and 15b, and 15c and 15d are equivalent to those of the driven gear 17, respectively. On the other hand, the pitch between the teeth 15b and 15c is formed more widely than the other pitch, which forms a second pitch portion. Therefore, when the driving gear 15 is rotated by the deformation of the bimetal 11, the teeth 15a and 15b or the teeth 15c and 15d will be disengaged with the teeth of the driven gear 17, and a tooth 17a of the driven gear 17 enters into the second pitch portion between the teeth 15b and 15c. In this state, the rotation of the driving gear 15 is not transmitted to the driven gear 17 due to the wide pitch of the second pitch portion. When the driving gear 15 is further rotated, the teeth 15b or 15c is engagement with the tooth 17b or 17c of the driven gear 17 again, then the rotation of the driving gear 15 come to be transmitted to the driven gear 17 again.

In this embodiment, the engagement of the driving and driven gears 15 and 17 is adjusted such that the pointer 13 is indicating a zone which indicates that a temperature of the cooling water resides in a normal condition when the tooth 17a of the driven gear 17 is positioned in the second pitch portion.

In the second pitch portion which is formed between the teeth 15b and 15c of the driving gear 15, there is provided an arched connecting portion 15B which connects between the under portions of the teeth 15b and 15c. Said connecting portion 15B is formed so as to have a certain thickness. On the other hand, the width of the tooth 17a in its axial direction which is to be entered into the second pitch portion is thinner than the those of teeth of its both sides to the extent of at least the thickness of the connecting portion 15B.

Accordingly, when the tooth 17a of the driven gear 17 is located in the second pitch portion of the driving gear 15, if the driving gear 15 is rotated, the driven gear 17 is not rotated since the teeth 17b and 17c located on both sides of the tooth 17a are abutting with the outer surface of the connecting portion 15B, respectively, without engagement with the teeth of the driving gear 15. In this condition, even if an external force such as vibration is added to the indicator, this will not cause the pointer 13 is swung by the vibration due to the abutments.

In addition, as shown in FIGS. 3 and 4, another oblong aperture 15A' is formed on the driving gear 15, which is prepared for a case that the pointer 13 is rotated in the opposite direction. Further, there is formed a sector notch 15C on the driving gear 15, which is used as a balance weight of the gear 15. In addition, in the driven gear 17, the tooth having large width and the tooth having small width are provided one after the other. This is prepared for a case where a relationship of the driving gear 15 and driven gear 17 must be changed to change an indicating area of the pointer 13 to the other area.

According to the constructions described above, when the pointer 13 indicates the lower temperature zone under the normal temperature zone which is shown in FIG. 4, the teeth 15a and 15b of the driving gear 15 is engagement with the tooth 17b of the driven gear 17, thereby the rotation of the driving gear 15 is transmitted to the driven gear 17.

Further, when the pointer indicates the normal temperature zone, the tooth 17a is entered into the second pitch portion between the teeth 15b and 15c of the driving gear 15. In this case, however, since the pitch between the teeth 15b and 15c is wider than those between the other teeth, the rotation of the driving gear 15 can not be transmitted to the driven gear 17 while the tooth 17a of the driven gear 17 moves in the second pitch portion, thereby the pointer 13 being kept on indicating a fixed point in the zone. In this case, the teeth 17b and 17c of the driven gear 17 are abutting with the outer surface of the connecting portion 15B provided in the second pitch portion of the driving gear 15, so that the driven gear 17 is stopped at that position and the pointer 13 is not affected by the vibration caused by the external force due to the abutments.

Furthermore, when the pointer indicates the high temperature area, the teeth 15c and 15d of the driving gear 15 are in engagement with the tooth 17c of the driven gear 17, the rotation of the driving gear 15 is transmitted to the driven gear 17.

Figure 5:
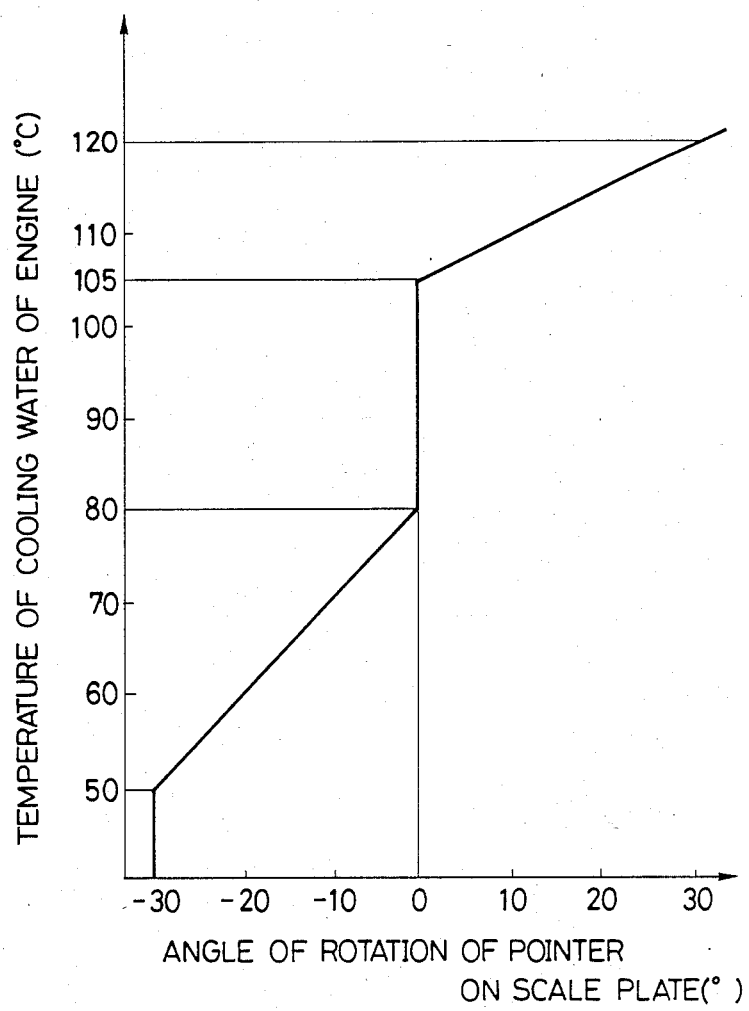
FIG. 5 is a graph showing an indication characteristics according to the first embodiment.

The indicating characteristics in the operation described above is represented as shown in FIG. 5. Specifically, within the range of 80° C.-105° C. which corresponds to the normal temperature range of the engine cooling water, the rotational force of the driving gear 15 is not transmitted to the driven gear 17, so that the pointer 13 is indicating a central point of the normal temperature zone of the scale plate 14 without swinging of the pointer 13.

As stated above, according to the present invention, the movement of the pointer 13 is stopped in the normal temperature range of the cooling water of the engine. Therefore, even if there is a dispersion in the indication of the heat gauge or resistance value of the thermistor sensor, as well as a temperature difference of a cooling water according to the kinds of engines of automobiles, within the normal temperature range the indicator keeps on pointing at a fixed point, so that there is no possibility that the driver misunderstands the indicating value or is anxious about that the automobile may be out of order.

Figure 6:
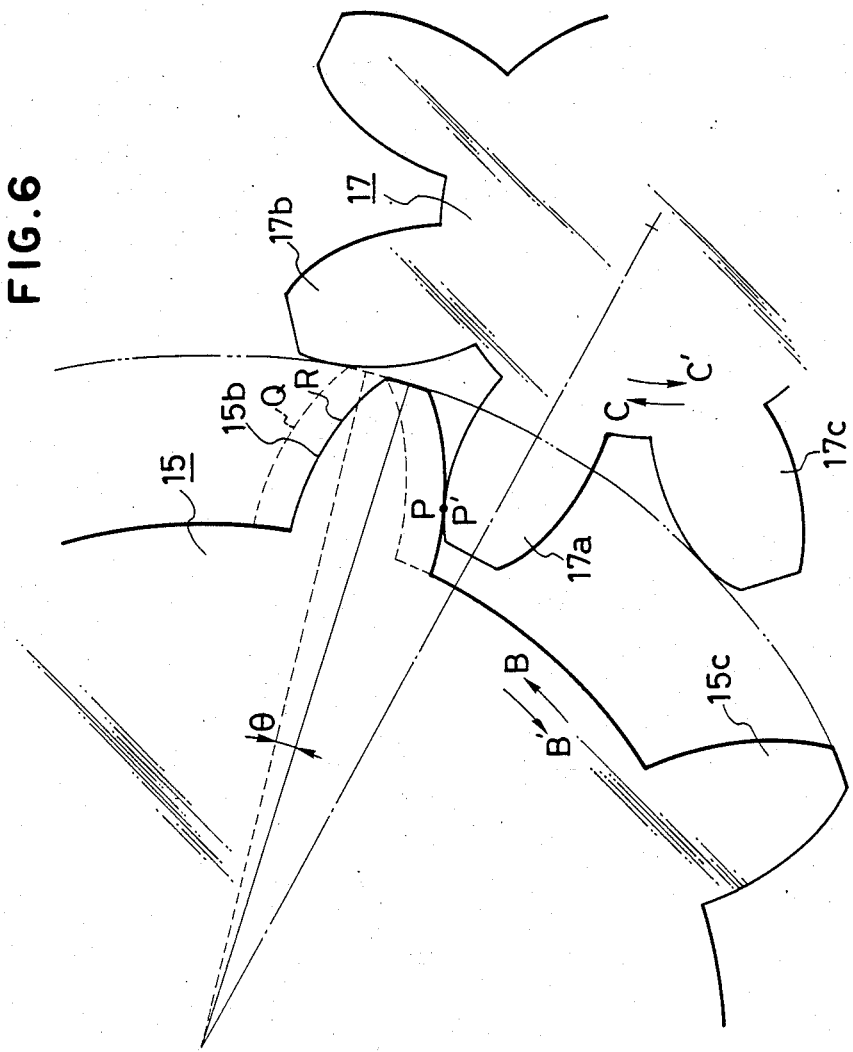
FIG. 6 is an explanation view which explains a problem to be solved by the second embodiment of the present invention.
Figure 7:
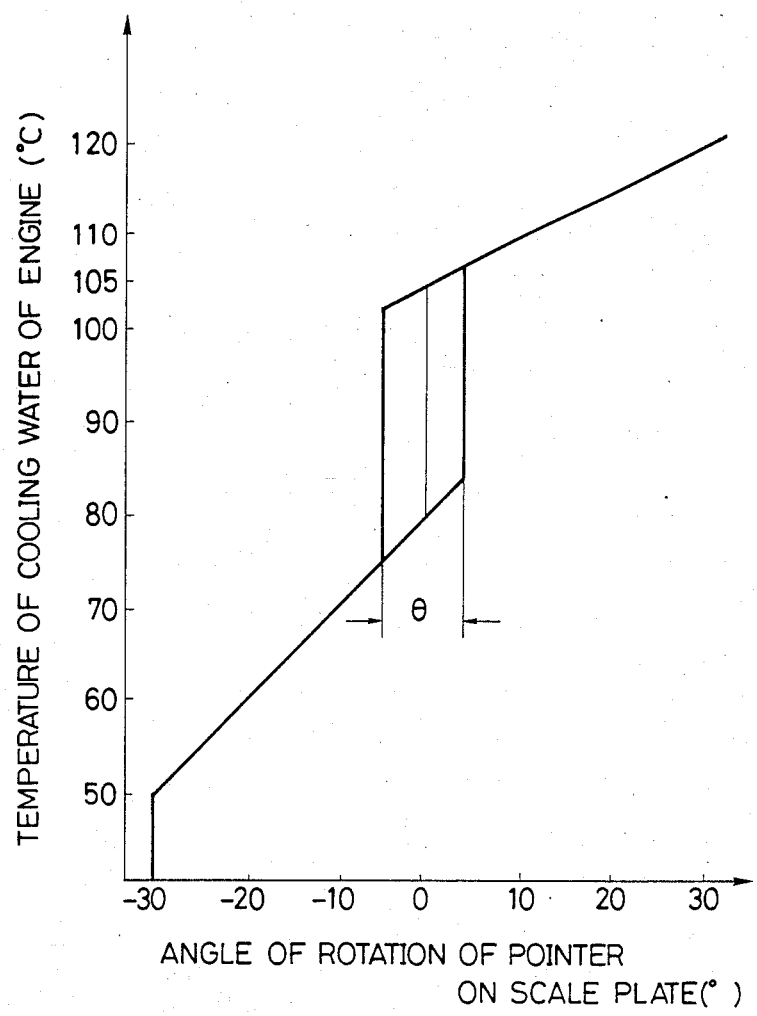
FIG. 7 is a graph showing the problem with an indication characteristics.
Figure 8:
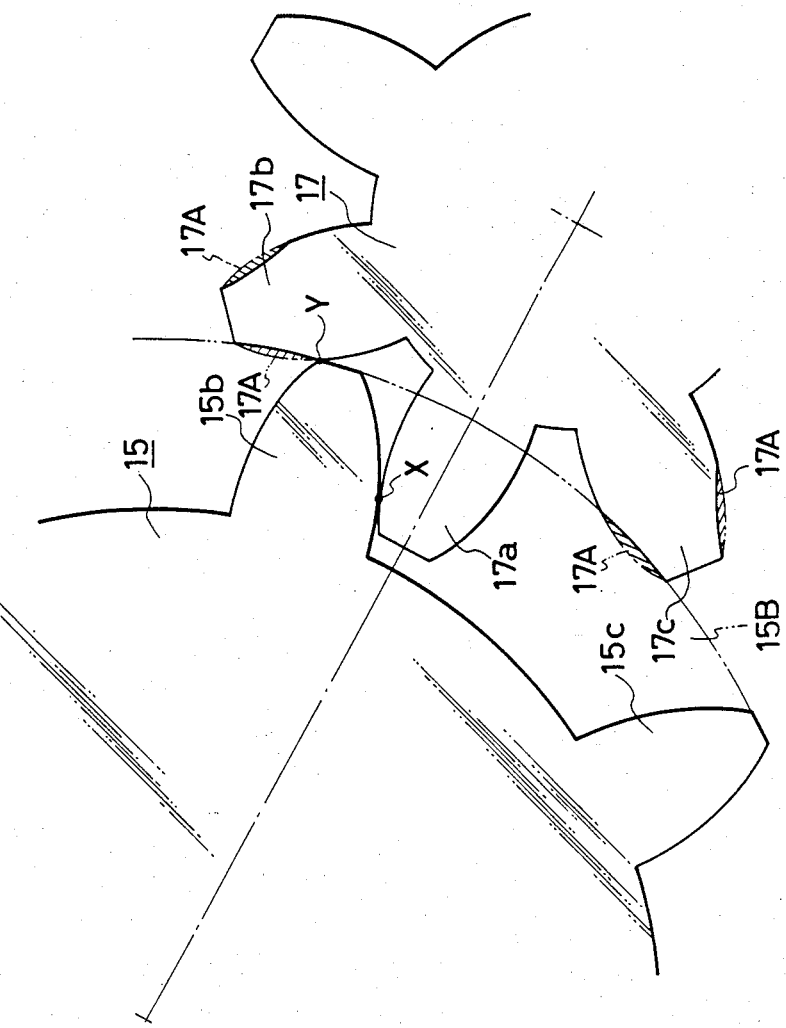
FIG. 8 is a plan view of the second embodiment of the present invention.
Figure 9:
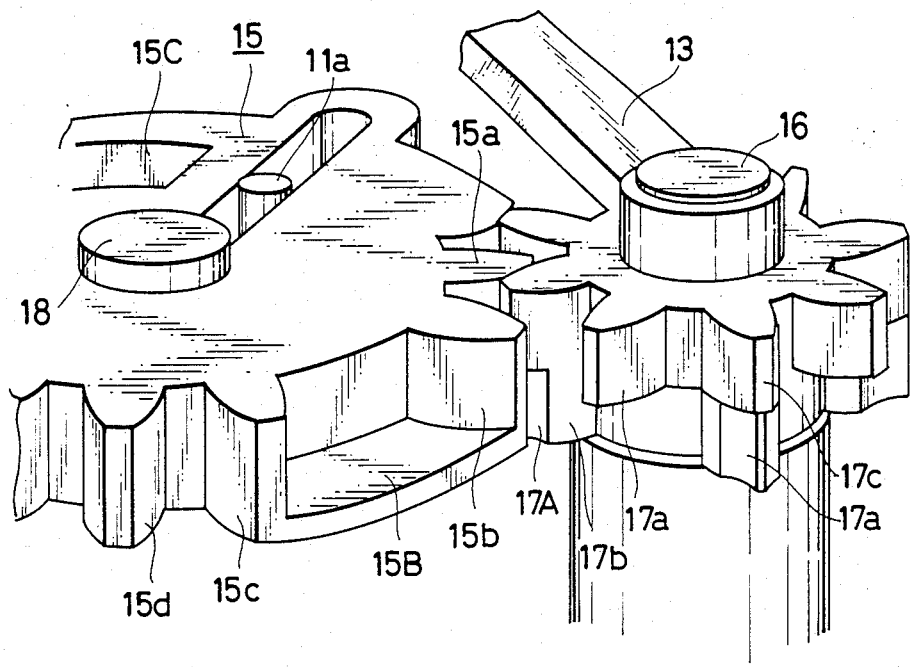
FIG. 9 is a perspective view of the second embodiment.

In FIGS. 6 to 9, another embodiment of this invention is described. In particular, FIGS. 6 and 7 show the aspect of improvement in the embodiment, and FIG. 8 is a plan view of a principal part of the embodiment and FIG. 9 is a perspective view of the principal part.

The bimetallic indicator of this embodiment is almost same as the first embodiment in construction, so that hereinafter only the difference between both embodiments will be explained.

The difference resides in the shape of the teeth of the driven gear 17 which is in engagement with the driving gear 15.

FIG. 6 shows the condition that the tooth 17a having a small width is positioned in the second pitch portion of the driving gear 15. In this state, if the driving gear 15 is rotated couterclockwise (which corresponds to the arrow B) and rotates the driven gear 17 by pushing the tooth 17b of the driven gear 17 with the tooth 15b of the driving gear 15. In this case, when the tooth 15b is moved to the position Q indicated by a chain line, the rotation of the driven gear 17 is stopped. On the other hand, when the driving gear 15 is rotated clockwise (which corresponds to the arrow B'), the driven gear 17 is not moved even when the tooth 15b of the driving gear 15 reaches the position Q. The driven gear 17 is not rotated until the tooth 15b is reached at the position indicated by a solid line R. Specifically, as shown in FIG. 6, the driven gear 17 is not rotated until the point of P of the tooth 15b of the driving gear 15 is come to contact with the point P' of the tooth 17a of the driven gear 17. In other words, according to the rotational directions of the driving gear 15, there is a deviation of the angle of $\theta$ between the relative positions of the driving and driven gear 15 and 17. This relationship is illustrated in FIG. 7. As seen from the drawing, the accuracy of the indication of the temperature is deteriorated due to the deviation $\theta$ at the time when the temperature of the engine cooling water is rose or dropped.

This embodiment has been made to settle this problem. Specifically, as shown in FIGS. 8 and 9, both sides of the tooth 17b and the tooth 17c are cut away partly to form arched portions 17A, respectively. Each of the arched portions 17A has a curved surface along the circumferential line of the connecting portion 15B of the driving gear, 15. The arched portions 17A are represented by the hatched lines in FIG. 8. As shown in FIG. 9, it is preferable that said arched portion 17A is formed on a portion of each tooth 17b or 17c where the tooth of the driven gear 17 is in contact with the connecting portion 15B of the driving gear 15. The distance between the axis 18 of the driving gear 15 and the axis 16 of the driven gear 17 is set, as shown in FIG. 8, such that the tooth 15b is contacted with the teeth 17a and 17b at the points X and Y, respectively.

In accordance with the driven gear 17 having the construction described above, in spite of the directions of the rotation of the driving gear 15, the starting position and the stopping position of the driven gear 17 is kept in constant, so that in this case the angle $\theta$ becomes substantially zero. Therefore, the accuracy of the temperature indication at the time when the temperature is rose or dropped is improved.

In the above description of the embodiments, the heat gauge is used as an indicator. However, the other indicators which are required that a pointer indicate a fixed point within a range indicating that measured value is in a normal condition, such as bimetallic pressure gauges and so forth, are of course included in the scope of the invention.

Further, in the embodiment, although the connecting portion is formed between the teeth 15b and 15c integrally, it may be possible to form the connecting portion from a different part such as a sector plate and attach the teeth 15b and 15c.

In addition, in the embodiments, although the pointer and the driven gear are different parts, it may be possible to form them integrally from one part. Specifically, it may be possible to form the driven gear and the pointer by bending a metal sheet such as aluminum punched to a predetermined shape. The sheet has a gear portion having a plurality of teeth and a pointer portion consisting of an elongated portion which is extended from on the gear portion. The pointer is formed by bending the elongated portion to C-shape. According to the indicator having the above structure, it can be prevented that a deviation will be caused between the pointer and the driven gear, thereby accuracy of indication in the indicator being further improved. Further, since the number of the parts is decreased, cost down in the manufacturing and simplification of the assembly can be attained.

It must be understood that the invention is in no way limited to the above embodiments and that many changes may be brought therein without departing from the scope of the invention as defined by the appended claims.

What is claimed is:

1. A bimetallic indicator, comprising:
    a bimetal being deformed by an electric current supplied to a heat coil wound around the bimetal;
    a pointer moved in relation to the deformation of the bimetal and indicating a measured value in accordance with an amount of electric current supplied to the heating coil;
    a driving gear rotated by the deformation of said bimetal, and said driving gear including at least two first pitch portions each having a plurality of teeth with a regular pitch, and a second pitch portion provided between the first pitch portions and having a pitch smaller than that of the first pitch portion; and
    a driven gear to which said pointer is mounted, and said driven gear having a plurality of teeth being engaged with said driving gear and rotated together with the pointer by the rotation of the driving gear, and the size of said driven gear smaller than the that of said driving gear for enlarging the rotational angle of the pointer;
    wherein the rotation of the driving gear is transmitted to the driven gear only when the first pitch portion of the driving gear is in engagement with the driven gear.

2. A bimetallic indicator as claimed in claim 1, wherein the bimetallic indicator is constructed such that when the driven gear is in engagement with the second pitch portion, the pointer is indicating a zone on a scale which indicates that the condition of the measuring object of the indicator is at a normal level.

3. A bimetallic indicator as claimed in claim 2, wherein the width of a tooth in the driven gear to be engaged with the second pitch portion is smaller than those of the teeth located on either side of the small width teeth, and a connecting portion is provided between teeth of the driving gear which defines the second pitch portion, whereby said teeth of said driven gear are abutted on the connecting portion for preventing displacement of the driven gear when the small width tooth of the driven gear is positioned in the second pitch portion.

4. A bimetallic indicator as claimed in claim 3, wherein said connecting portion has an arched shaped with a circumferential surface on which said teeth of the driven gear are abutted.

5. A bimetallic indicator as claimed in claimed in claim 4, wherein each of said teeth of the driving gear forming the second pitch portion has an under portion, and said connecting portion is provided between the under portions of the teeth integrally.

6. A bimetallic indicator as claimed in claim 5, wherein said small width tooth of the driven gear passes on the connecting portion when the driving gear is rotated.

7. A bimetallic indicator as claimed in claim 5, wherein said connecting portion comprises a sector plate which is mounted to the teeth of the second pitch portion.

8. A bimetallic indicator as claimed in claims 3 to 7, wherein each of said teeth located on either side of the small width tooth of the driven gear which is engaged with the second pitch portion has oppositely disposed sides, and two concave surfaces for preventing backlash caused when the rotational direction is changed are formed by partially cutting the oppositely disposed sides of each of said teeth located on either side of the small width tooth of the driven gear.

9. A bimetallic indicator as claimed in claim 8, wherein each of said concave surfaces has an arc equal to the radius of said connecting portion.

10. A bimetallic indicator as claimed in claim 9, wherein each of said concave surfaces is formed on a portion of each tooth of the driven gear where the tooth is contacted with the connecting portion.

* * * * *